(12) United States Patent
Kapp et al.

(10) Patent No.: US 7,487,691 B2
(45) Date of Patent: Feb. 10, 2009

(54) ACTUATOR ARRANGEMENT HAVING SELECTOR DRUMS FOR A TWIN-CLUTCH TRANSMISSION

(75) Inventors: Stefan Kapp, Walheim (DE); Reinhard Schaarschmidt, Illingen (DE); Georg Burgardt, Bretzfeld (DE); Oliver Eppler, Georgen (DE)

(73) Assignee: Getrag Getriebe- und Zahnradfabrik Hermann Hagenmeyer GmbH & Cie KG, Untergruppenbach (DE)

(*) Notice: Subject to any disclaimer, the term of this patent is extended or adjusted under 35 U.S.C. 154(b) by 0 days.

(21) Appl. No.: 11/751,548

(22) Filed: May 21, 2007

(65) Prior Publication Data
US 2008/0134819 A1 Jun. 12, 2008

Related U.S. Application Data

(63) Continuation of application No. PCT/EP2005/012113, filed on Nov. 11, 2005.

(30) Foreign Application Priority Data
Nov. 23, 2004 (DE) .................. 10 2004 058 475

(51) Int. Cl.
F16H 59/02 (2006.01)
(52) U.S. Cl. .................. 74/337.5; 74/340; 74/473.21
(58) Field of Classification Search ............... 74/337.5, 74/340, 342, 473.21
See application file for complete search history.

(56) References Cited

U.S. PATENT DOCUMENTS

| | | | | |
|---|---|---|---|---|
| 2,584,629 A | * | 2/1952 | Smith | 82/137 |
| 4,656,882 A | * | 4/1987 | Kerr | 74/337.5 |
| 4,926,714 A | * | 5/1990 | Bailey | 74/337.5 |
| 5,542,309 A | * | 8/1996 | Wenger et al. | 74/337.5 |
| 5,590,563 A | * | 1/1997 | Kuwahata et al. | 74/337.5 |
| 5,724,856 A | * | 3/1998 | Back | 74/335 |
| 5,735,176 A | * | 4/1998 | Winkam et al. | 74/337.5 |
| 5,966,989 A | | 10/1999 | Reed, Jr. et al. | |

(Continued)

FOREIGN PATENT DOCUMENTS

DE 30 37 990 A1 5/1982

(Continued)

OTHER PUBLICATIONS

PCT/EP2005/012113 Copy of International Search Report dated Feb. 27, 2006.

*Primary Examiner*—Ha D. Ho
(74) *Attorney, Agent, or Firm*—Knobbe, Martens, Olson & Bear, LLP (57) ABSTRACT

An actuator arrangement for a twin-clutch transmission has a first and a second partial transmission. The first partial transmission contains odd forward gear stages and the second partial transmission contains even forward gear stages. At least one first and one second selector drum have in each case one controllable drive motor and at least one control cam. Each control cam is assigned at least one cam follower. The control cam of at least one selector drum encircles through at least 360°. The associated drive motor is designed to drive said selector drum through at least 360°. The gear stages are distributed on the two selector drums, and arranged on the control cams, in such a way that at least one direct multiple shift can be carried out.

25 Claims, 9 Drawing Sheets

U.S. PATENT DOCUMENTS

2007/0107542 A1    5/2007    Gumpoltsberger

FOREIGN PATENT DOCUMENTS

| | | |
|---|---|---|
| DE | 195 09 477 A1 | 9/1996 |
| DE | 195 43 645 A1 | 5/1997 |
| DE | 196 38 269 A1 | 3/1998 |
| DE | 199 24 335 A1 | 12/2000 |
| DE | 199 20 440 C2 | 1/2002 |
| DE | 101 28 854 A1 | 12/2002 |
| DE | 198 40 621 C2 | 2/2003 |
| DE | 102 03 633 A1 | 9/2003 |
| DE | 103 44 106 A1 | 4/2004 |
| DE | 103 05 241 A1 | 9/2004 |
| EP | 0 288 779 | 11/1988 |
| EP | 0 987 467 A2 | 3/2000 |
| EP | 1 182 376 A2 | 2/2002 |
| EP | 0 831 256 B1 | 12/2002 |
| EP | 1 286 088 A1 | 2/2003 |
| EP | 1 333 201 A2 | 8/2003 |
| FR | 2 798 444 | 3/2001 |

* cited by examiner

ACTUATOR ARRANGEMENT HAVING SELECTOR DRUMS FOR A TWIN-CLUTCH TRANSMISSION

CROSS-REFERENCE TO RELATED APPLICATIONS

This is a continuation application of International application PCT/EP2005/012113 filed Nov. 11, 2005, and claiming the priority of German patent application DE 10 2004 058 475, filed Nov. 23, 2004.

BACKGROUND OF THE INVENTION

The present invention relates to an actuator arrangement for a twin-clutch transmission which has a first and a second partial transmission, with the first partial transmission containing odd forward gear stages and with the second partial transmission containing even forward gear stages, having at least one first and one second selector drum which have in each case one controllable drive motor and at least one control cam, with each control cam being assigned at least one cam follower, with it being possible for the cam followers to be connected in each case to a selector sleeve of an associated shift clutch pack in order to engage and disengage gear stages of the twin-clutch transmission.

1. Prior Art

Selector drums which, in a shift transmission, axially move a sliding block, a roller or a similar cam follower, and thereby a shift fork which is connected to the cam follower, by means of a control cam or curved track (selector drum groove) or a bead, in order to engage or disengage a gear by means of a shift clutch.

Selector drum systems having one or more selector drums.

Motorcycle transmission having selector drum actuation.

Principle structure and function of a twin-clutch transmission (DKG) or powershift transmission having two clutches and two partial transmissions connected thereto, with it being possible for transmission stages and therefore individual gears or gear stages of the twin-clutch transmission to be realized by means of fixed wheels and loose wheels which can be connected in a rotationally form-fitting manner by means of shift clutches.

Selector drum systems having two selector drums and one wheel set arrangement, in which the even gears are served by the one roller and the odd gears are served by the other roller (DE 198 40 621 C2; DE 199 20 440 C2).

Selector drums having an encircling groove (DE 199 24 335 A1).

Use of at least two selector drums for a twin-clutch transmission (EP 1 182 376 A2; DE 101 28 854 A1).

Prior art pursuant to § 3(2) PatG: DE 103 61 356.0: selector drum having a movable groove flank.

Use of a selector drum for a twin-clutch transmission (DE 101 28 854 A1, EP 0 831 256 B1; DE 30 37 990 A1).

Selector drum systems which allow gears to be skipped (primarily during downshifts) or the engagement of two gears simultaneously by means of axially moveable selector drums, adjusting members, force-loaded switch points or controlled switch points or corresponding groove sections (DE 101 28 854 A1, DE 196 38 269 A1, EP 0 831 256 B1, DE 199 24 335 A1, DE 195 09 477 A1, DE 195 43 645 A1).

2. Disadvantages of the Prior Art

Firstly, a skipping gears in multiple shifts (for example 6→3, 5→2 etc.) is a problem in particular in a twin-clutch transmission. When using a selector drum actuating arrangement having a selector drum, and in particular also when using a selector drum actuating arrangement having two selector drums with the separation of the even gears being situated on one selector drum and the odd gears being situated on the other roller, multiple shifts of said type are generally possible only if intermediate gears are "passed through", that is to say are also engaged and disengaged. "Passing through" the gears is necessary in order to be able to carry out subsequent single upshifts, with possible tractive force bridging, according to an expedient shift sequence logic.

Example:

Selector drum 01 (SCHW_01): R-1-3-5    Partial transmission 1

Selector drum 02 (SCHW_02): 2-4-6    Partial transmission 2

Here, if a tractive downshift 5-2 is to be directly carried out, specifically with tractive force bridging, that is to say without an interruption in tractive force, the following takes place: before the actual "gearshift" can take place by merging (crossfading) between the clutches, that is to say by means of a transfer of torque from the partial transmission 1 to the partial transmission 2, on SCHW_02, which according to the selector drum logic is in the $4^{th}$ gear or in neutral between the $4^{th}$ and $6^{th}$ gears or in $6^{th}$ gear, initially the $6^{th}$ gear is to be disengaged and the $4^{th}$ gear is to be engaged and disengaged or only the $4^{th}$ gear is to be disengaged, and then the $2^{nd}$ gear is to be subsequently engaged.

Only then can the torque transfer take place. Finally, SCHW_01 must then disengage the $5^{th}$ gear or even additionally engage and possibly again disengage the $3^{rd}$ gear in order to be able to subsequently directly carry out a possible 2-1 or 2-3 shift with tractive force bridging. SCHW_01 must accordingly be "tracked" (must follow).

Secondly, in the prior art, therefore, the gears cannot be directly freely selected in relation to one another, and it is therefore not possible for every driver demand, or every driving situation, to be optimally fulfilled or covered.

A lack of direct selection freedom in the event, for example, of multiple downshifts entails a considerable degree of additional expenditure in terms of time. The acceleration capability of a vehicle demanded for example by a 5-2 or 6-3 shift is therefore slowed, since, as described, gears must additionally be engaged or disengaged and only a purely sequential shift sequence is possible, respectively.

Thirdly in terms of functionality, the selector drum actuating arrangement is therefore considerably more disadvantageous than other shift actuating arrangements, in particular than a hydraulic shift actuating arrangement with individual rods, that is to say a shift unit having one actuator per gear pair or selector sleeve.

Fourthly, passing through the gears, or the tracking of the gears, likewise leads to an additional loading of the synchronizing units and thereby to a reduction of service life.

Fifthly, only by considerably increasing the structural expenditure or increasing the installation space demand and costs is it possible, with a selector drum actuating arrangement having two selector drums according to the prior art, to carry out only some of the possible, relevant direct multiple shifts as stated above.

BRIEF SUMMARY OF THE INVENTION

It is accordingly the object of the invention to specify an improved actuator arrangement and a twin-clutch transmission equipped with said actuator arrangement.

Said object is achieved in the actuator arrangement specified in the introduction in that the control cam of at least one selector drum encircles through at least 360°, the associated drive motor is designed to drive said selector drum through at least 360°, and the gear stages are distributed on the two selector drums, and arranged on the control cams, in such a way that at least one direct multiple shift can be carried out.

The object is also achieved by means of a twin-clutch transmission having an actuator arrangement of said type.

Preferred embodiments are specified in the subclaims.

The invention is realized in a shift actuating arrangement, preferably having two selector drums, in connection with a gear arrangement/gear pairing which is adapted specifically to the shift system, preferably in a 6+R-gear transmission, that is to say in a transmission having 7 engageable gears.

This leads to a cost-effective selector drum actuating arrangement, which is neutral in installation space terms, having two selector drums, in particular for a 6+R-gear twin-clutch transmission, which permits the degree of selection freedom which is sufficient for a twin-clutch transmission for a direct gear selection.

In a twin-clutch transmission according to the invention, the essential multiple downshifts or multiple upshifts with possible tractive force bridging or intermediate support can therefore be realized directly, in particular without additional engagement and disengagement processes of gears in the transmission.

Particularly important shifts include the multiple downshifts 6-3; 5-2; 6-5-2; 6-3-2 and the multiple upshifts 3-6; 2-5; 2-5-6; 2-3-6 (in contrast, the shifts 4-1 and 1-4 are usually less expedient on account of speed limitations of the engine).

The shift actuating arrangement according to the invention is capable, after said multiple shifts, of carrying out all subsequently possible single upshifts and single downshifts with possible tractive force bridging. The shift sequence logic is therefore always maintained. Gears need not be tracked.

This results overall in a considerable increase in functionality with a minimal increase in costs.

The implementation of the invention for a front-transverse twin-clutch transmission is particularly preferable.

Provision is preferably made of a (for example spring-load-controlled) switch point for the shift function of the reverse gear. This makes it possible to realize a particularly preferred embodiment in which the $1^{st}$ gear and the reverse gear are divided between the two partial transmissions.

The switch point can also be actively controlled by means of the $1^{st}$ gear, that is to say for example by means of the other selector drum.

The selector drums can in each case be formed as classic selector drums, as cam disks, from wound metal sheet etc., specifically with corresponding control cams in the form of a control groove, control bead or other control contour, etc.

The cam follower can be embodied as a sliding block, as a roller, as a pin etc.

The selector drum can be produced using all known production methods, for example can be of massive or constructed (multi-part) design.

The actuator arrangement can be realized, without a restriction in functionality, for a transmission with 6 or fewer gears. Said actuator arrangement can also be realized, without a restriction in functionality, for a transmission with 8 or more gears.

It is self-evident that the features specified above and the features yet to be explained below can be used not only in the respectively specified combination but also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
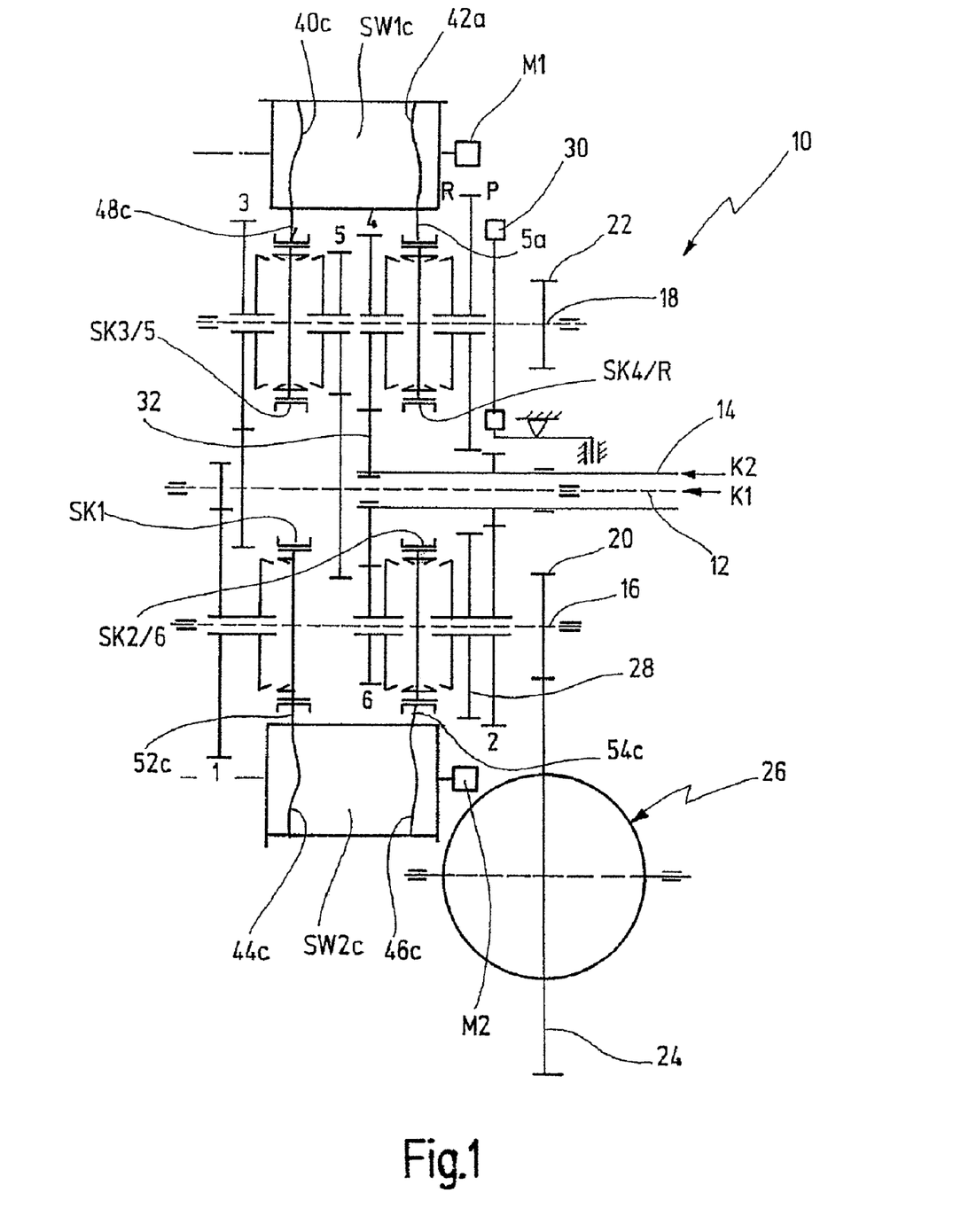
FIG. 1 shows a wheel set diagram of a first embodiment of a twin-clutch transmission according to the invention.

In FIG. 1, a first embodiment of a twin-clutch transmission according to the invention is denoted generally by 10.

The twin-clutch transmission 10 has a first drive input shaft 12 and a second drive input shaft 14. The second drive input shaft 14 is embodied as a hollow shaft and is arranged concentrically with respect to the first drive input shaft 12.

The first drive input shaft 12 can be connected to a first clutch K1. The second drive input shaft 14 can be connected to a second clutch K2.

The first drive input shaft 12 extends over a greater axial extent than the second drive input shaft and projects beyond the latter.

The twin-clutch transmission 10 also has a first drive output shaft 16 and a second drive output shaft 18. The two drive output shafts 16, 18 are arranged in each case parallel to the drive input shafts 12, 14 and are connected, by means of a drive output constant gear set, to a differential drive input wheel 24 of a differential gearing 26.

More precisely, the drive output constant gear set has a first drive output wheel 20 which is rotationally fixedly connected to the first drive output shaft 16, and has a second drive output wheel 22 which is rotationally fixedly connected to the second drive output shaft 18.

The two drive output wheels 20, 22 are aligned with one another axially and both engage with the differential drive input wheel 24.

The twin-clutch transmission 10 has six forward gear stages 1-6 and one reverse gear R. The odd forward gear stages 1, 3, 5 are assigned to a first partial transmission of the twin-clutch transmission 10 and therefore to the first clutch K1.

The even forward gear stages 2, 4, 6 and the reverse gear stage R are assigned to a second partial transmission of the twin-clutch transmission 10 and therefore to the second clutch K2.

The forward gear stages 1, 2 and 6 are assigned to the first drive output shaft 16. The forward gear stages 3, 4 and 5 and the reverse gear stage R are assigned to the second drive output shaft 18.

A shift clutch pack SK1 having one shift clutch is mounted on the first drive output shaft 16 and is assigned to the forward gear stage 1. A shift clutch pack SK2/6 having two shift clutches is assigned to the forward gears 2, 6. Correspondingly, a shift clutch pack SK3/5 having two shift clutches is assigned to the forward gear stages 3, 5 and a shift clutch pack SK4/R is assigned to the gear stages 4, R.

The shift clutches realized in the shift clutch packs SK are for example embodied as conventional synchronous clutches.

Arranged on the first drive output shaft 16, in this sequence proceeding from the transmission input, are: a first drive output wheel 20, a loose wheel for the forward gear stage 2, a rotational direction reversal wheel 28 for the reverse gear stage R, the shift clutch pack SK2/6, a loose wheel for the forward gear stage 6, the shift clutch pack SK1, and a loose wheel for the forward gear stage 1.

Correspondingly arranged on the second drive output shaft 18, in this sequence proceeding from the transmission input, are: a second drive output wheel 22, a parking lock 30, a loose wheel of the reverse gear stage R, the shift clutch pack SK4/R, a loose wheel for the forward gear stage 4, a loose wheel for the forward gear stage 5, the shift clutch pack SK3/5, and a loose wheel for the forward gear stage 3.

The rotational direction reversal wheel 28 and the loose wheel for the forward gear stage 2 are rotationally fixedly connected to one another. The rotational direction reversal wheel 28 is aligned axially with the loose wheel of the reverse gear stage R on the second drive output shaft 18. Correspondingly, the parking lock 30 is aligned axially with the loose wheel for the second forward gear stage 2 on the first drive output shaft 16.

In addition, the forward gear stages 4, 6 are aligned axially with one another and mesh with a common fixed wheel 32. In other words, a so-called dual use of the forward gear stages 4, 6 is realized.

In the transmission 10, the forward gear stage 1 and the reverse gear stage R are situated on different partial transmissions and are therefore assigned to different clutches K1 and K2.

The reverse gear stage R is driven by means of the rotational direction reversal wheel 28 of the forward gear stage 2, that is to say so to speak by means of the stepped second gear. Here, it is possible to realize a transmission ratio similar to that of the first gear.

The parking lock 30 is attached opposite the loose wheel or shift wheel of the forward stage 2.

A dual use is realized. The forward gear stages 1, 2 are situated on one drive output shaft, the output drive shaft 16. In total, four synchronous clutch packs SK are provided.

The forward gear stage 1 is situated on the drive output shaft 16 with a short axial spacing. The gear stages with a large shift wheel or large loose wheel diameter (in the present case, the gear stages 1 and 2 on the drive output shaft 16 and the gear stages 3 and R on the drive output shaft 18) are arranged axially at the outside, so that an actuating arrangement having two selector drums SW1c, SW2c, as described below, can be arranged in between, radially close to the drive output shafts 16, 18.

The twin-clutch transmission 10 is embodied as an automatic transmission. The shift clutch packs SK are connected to the two selector drums SW1c, SW2c. Correspondingly, the clutches K1 and K2 are also actuated automatically.

The actuator arrangement according to the invention for the twin-clutch transmission 10 has a first selector drum SW1c, which is arranged between the loose wheels of the gear stages 3, R on the second drive output shaft 18, and has a second selector drum SW2c which is arranged between the loose wheels of the gear stages 1, 2 on the first drive output shaft 16. The selector drums SW1c, SW2c are mounted parallel to the shafts 16, 18 and are driven by schematically indicated motors, in particular by electric motors M1 and M2, respectively.

Arranged on the first selector drum SW1c are a first control cam 40c, into which a first cam follower 48c engages, and a second control cam 42c, into which a second cam follower 50c engages.

Arranged on the second selector drum SW2c are a third control cam 44c, into which a third cam follower 52c engages, and a fourth control cam 46c, into which a fourth cam follower 54c engages.

The cam follower 48c is coupled to a selector sleeve which operates the shift clutch pack SK3/5. The cam follower 50c is coupled to a selector sleeve which operates the shift clutch pack SK4/R. The cam follower 52c is coupled to a selector sleeve which operates the shift clutch pack SK1. The cam follower 54c is coupled to a selector sleeve which operates the shift clutch pack SK2/6.

Figure 2A:
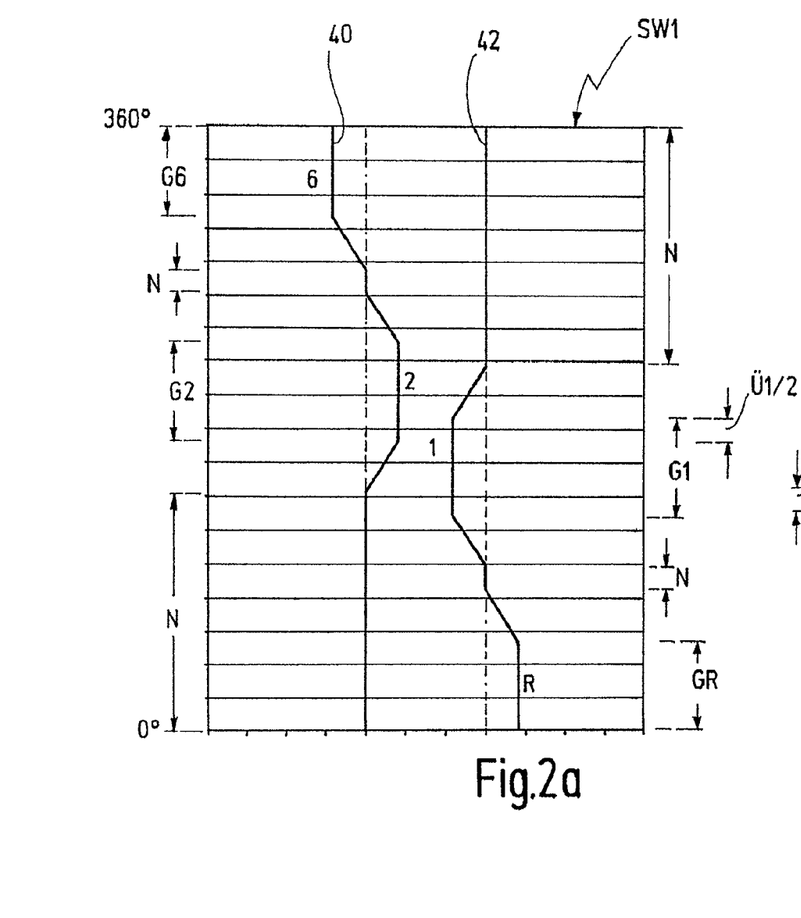
FIG. 2 shows schematic unwound views of two selector drums of a first embodiment of the actuator arrangement according to the invention.
Figure 2B:
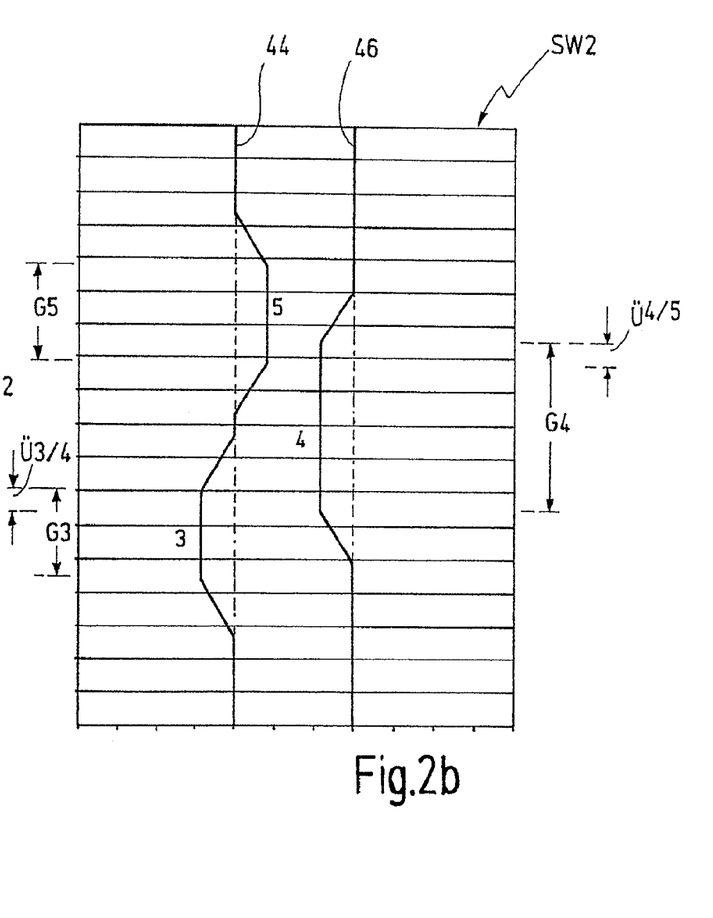
Figure 3:
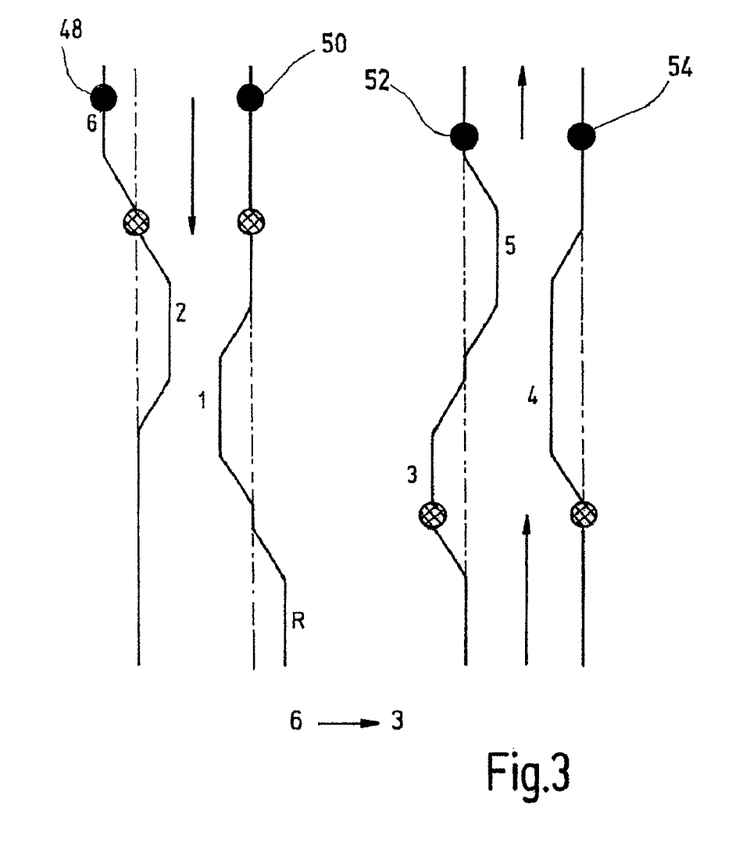
FIG. 3 shows the schematic sequence of a multiple shift 6→3 with the actuator arrangement of FIG. 2.
Figure 4:
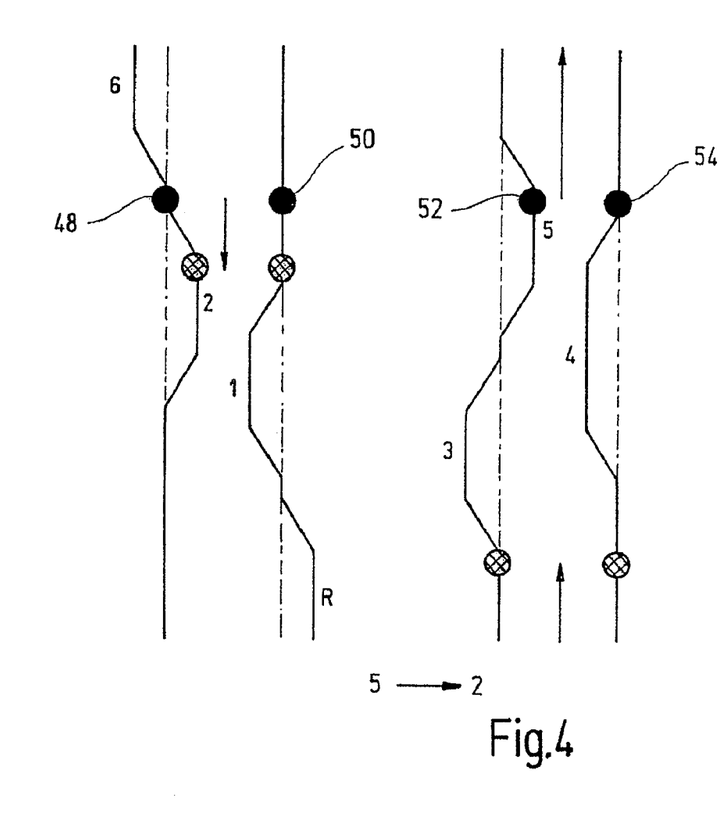
FIG. 4 shows the schematic sequence of a multiple shift 5→2 with the actuator arrangement of FIG. 2.

FIG. 2 shows the unwound views of two selector drums SW1, SW2 which can be assigned to an alternative twin-clutch transmission in which one drive output shaft is assigned the gear stages 1, 2, 6, R and the other drive output shaft is assigned the gear stages 3, 4, 5.

FIGS. 3-6 show typical shift sequences with the selector drums of FIG. 2, as follows:

For clarity, those positions of the cam followers 48-54 (for example sliding blocks) are considered which would result as the selector drums SW1, SW2 are rotated.

The following state is taken as a starting point: a "start gear" is engaged and another "target gear" is additionally engaged. After the merging (crossfading) between the clutches K1, K2, the target gear remains in the shift position and the start gear is disengaged into neutral.

Said positions are to be understood merely as examples since, depending on the shift strategy, a corresponding target gear can already be selected or another target gear is already pre-selected which must then initially be disengaged, or a corresponding start gear is not disengaged after the merging between the clutches. The capability of realizing shifts according to the invention is however maintained at all times.

The shift sequence can analogously be transferred to the different gear positions, depending on the shift strategy, at the start of the shift demand.

In FIGS. 3-6, a solid dot denotes possible start positions, a checked dot denotes possible target positions, and a striped dot denotes an intermediate position.

Figure 5:
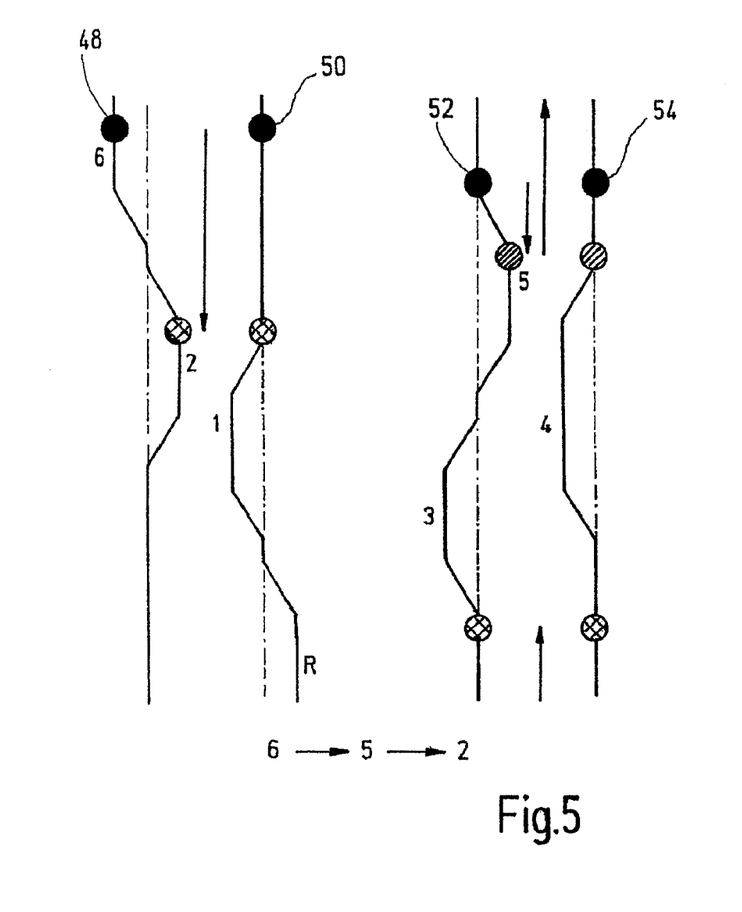
FIG. 5 shows the schematic sequence of a multiple shift 6→5→2 with the actuator arrangement of FIG. 2.
Figure 6:
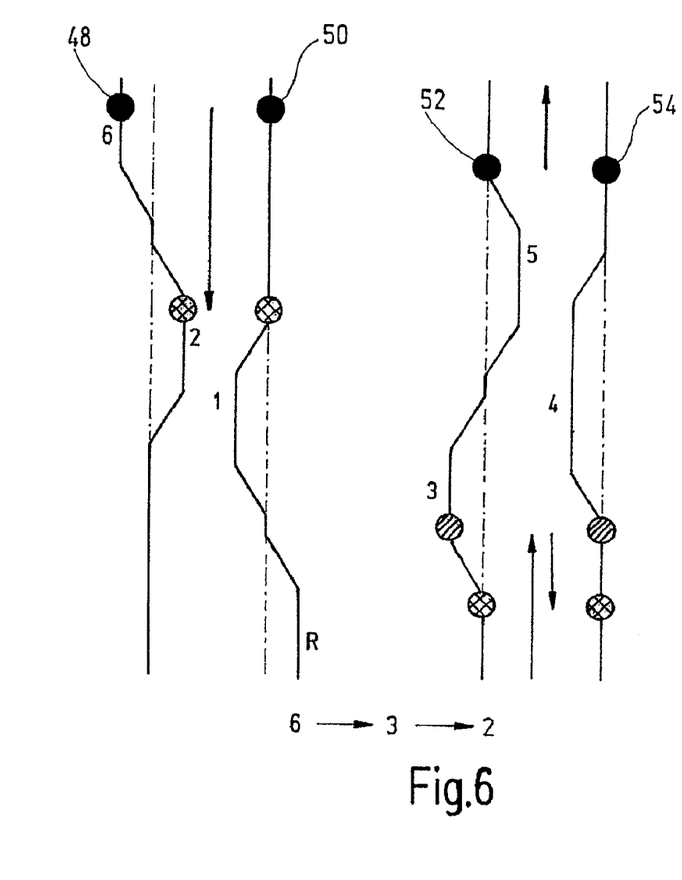
FIG. 6 shows the schematic sequence of a multiple shift 6→3→2 with the actuator arrangement of FIG. 2.

As illustrated, multiple downshifts can, according to the invention, be carried out directly, in particular without it being necessary to engage an intermediate gear. Here, the examples of FIGS. 5 and 6 show situations in which a moderate downshift is initially carried out under traction (for example during a kickdown), and in which then (for example during a continued kickdown) a further downshift is carried out or a direct downshift is carried out via an intermediate gear without an interruption in tractive force.

All the sequences are reversible. The multiple upshifts 2-5; 3-6; 2-3-6; 2-5-6 can therefore also be carried out directly. All the sequences can be applied in terms of their basic logic to all of the described embodiments. Here, at least one selector drum always rotates more then 360°.

Figure 7A:
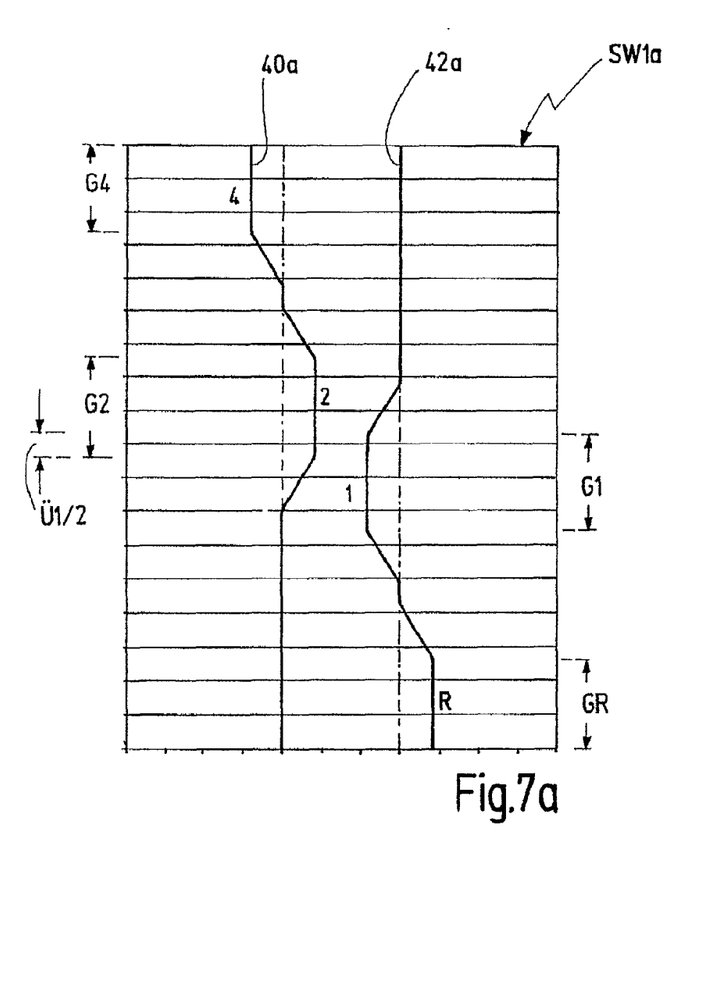
FIG. 7 shows schematic unwound views of two selector drums of a second embodiment of the actuator arrangement according to the invention.
Figure 7B:
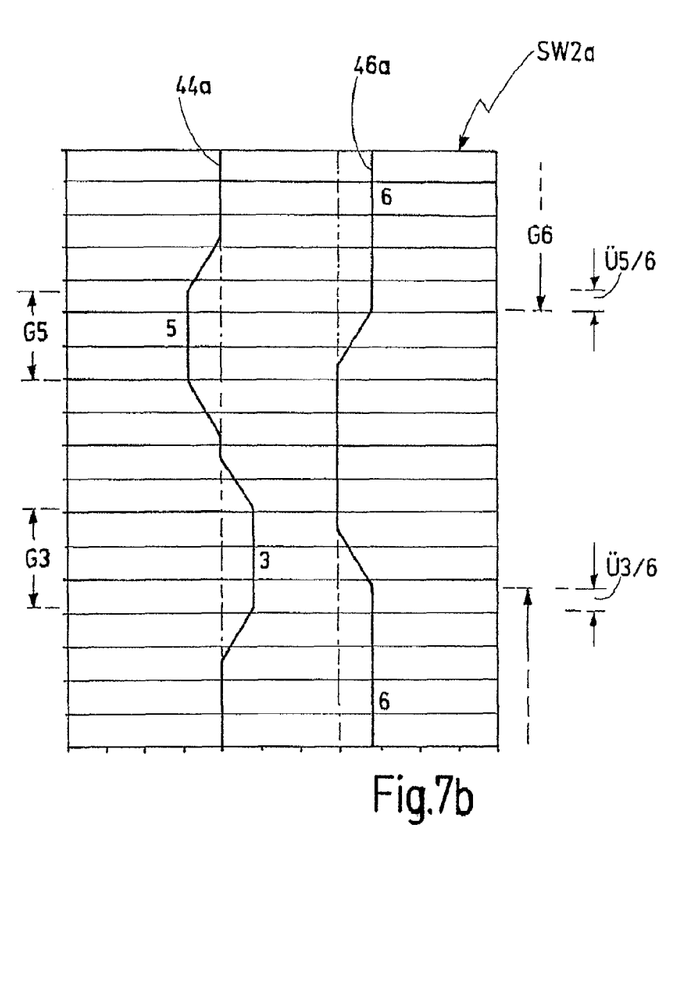
Figure 8A:
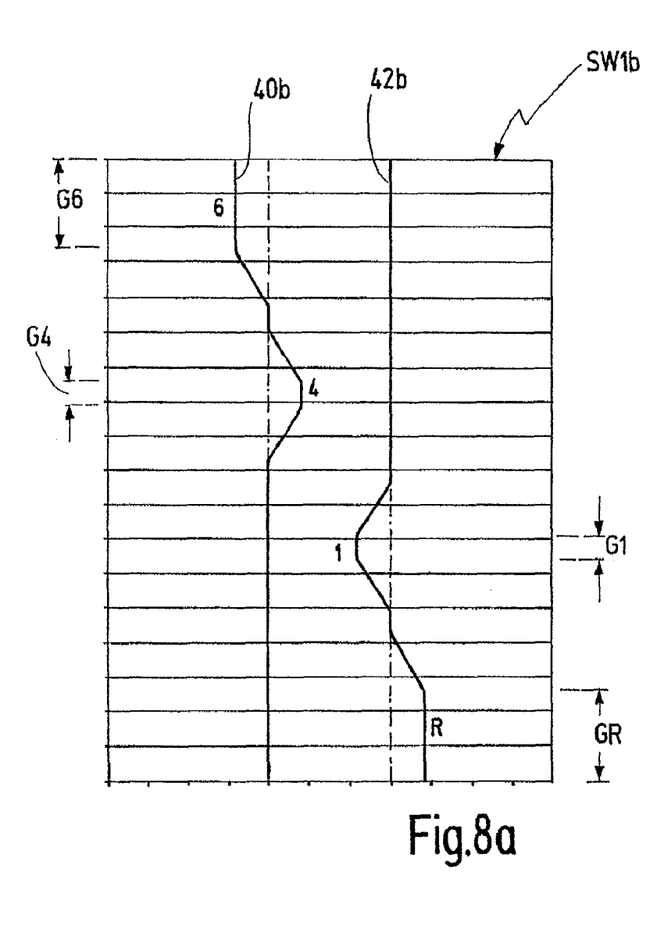
FIG. 8 shows schematic unwound views of two selector drums of a third embodiment of the actuator arrangement according to the invention.
Figure 8B:
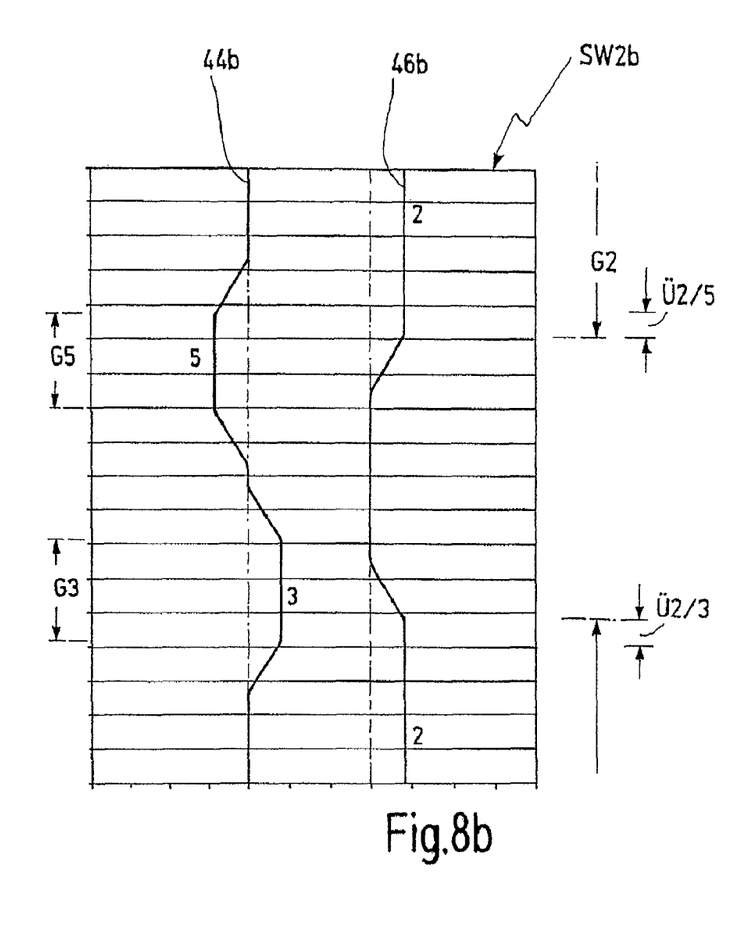

FIGS. 7 and 8 show alternative embodiments.

The shift actuating arrangement can generally be used in all transmission types. It can advantageously be used in front-transverse transmissions. It can advantageously be used in particular in front-transverse transmissions of 3-shaft design. It can particularly advantageously be used in front-transverse transmissions which are of 3-shaft design and have an axially parallel arrangement of the shift devices/selector drums with respect to the drive output shafts. This permits an optimum adaptation of the shift device to the wheel set and therefore an optimum transmission package.

The possibility of carrying out direct multiple shifts with a selector drum system having two selector drums is realized by means of at least one, preferably by means of a combination of the following points:

- a selector drum system having two selector drums, with at least one selector drum which has an encircling groove;
- at least one selector drum is rotatable through 360°;
- elimination of the separation of even/odd gears with respect to the selector drums;
- 1/R are situated on one selector sleeve;
- overlapping regions Ü in the control cams of the selector drums make it possible with only one selector drum to actuate two successive gears within the context of the basic concept of a twin-clutch transmission (tractive force bridging) and to generate a state in which the two gears are engaged at the same time.

Figure 9A:
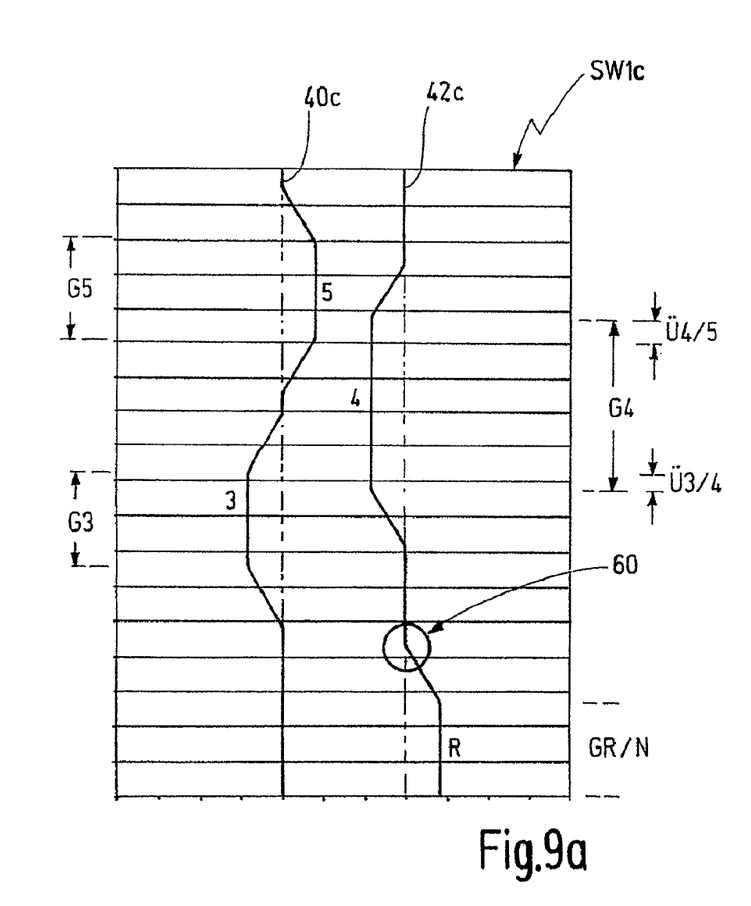
FIG. 9 shows schematic unwound views of two selector drums of a fourth embodiment of the actuator arrangement according to the invention which is realized in the twin-clutch transmission of FIG. 1.
Figure 9B:
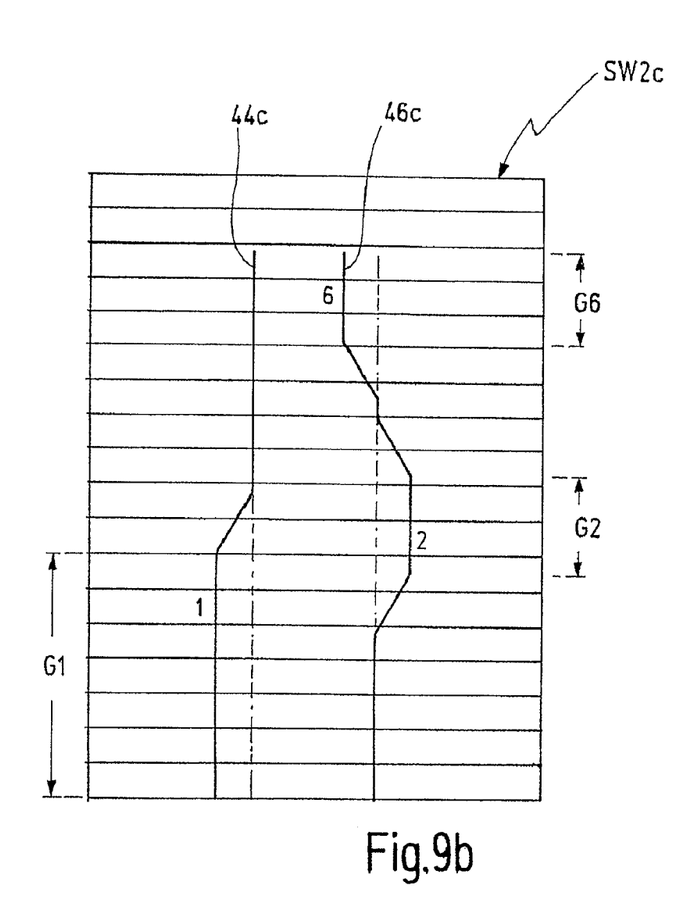

FIG. 9 shows a particularly preferred embodiment of an actuator arrangement having two selector drums SW1c, SW2c, which can be used in particular for the twin-clutch transmission 10 of FIG. 1. The mode of operation is generally comparable to the actuator arrangements of FIGS. 2, 7 and 8. The following text describes substantially the differences in this regard.

On the one hand, the $1^{st}$ gear and the reverse gear are not situated on one synchronizing unit/selector sleeve. In addition, the $1^{st}$ gear and the reverse gear R are also not controlled by means of one selector drum groove or one cam follower.

The selector drum SW1c is formed with encircling control cams 40c, 42c for the gears 3, 5 and 4, R, respectively. In addition, the control cam 42c is equipped with a switch point 60, specifically for engaging or skipping the reverse gear.

The design or actuation of the switch point 60 can correspond in principle to a moveable selector drum groove flank 62 (cf. FIGS. 10, 11), specifically a selector drum engagement groove flank.

The switch point 60 can be controlled by means of an auxiliary energy source, preferably by means of a spring force (spring 64).

Alternatively, the switch point 60 is actively controlled (cf. FIGS. 12, 13), for example by means of the other selector drum SW2c. In the illustrated case, the active control is provided by means of a coupling (coupling member 66) of the gear position of the $1^{st}$ gear.

Despite its increased complexity in terms of the shift, the variant of FIGS. 9-13 is preferable since, with the associated wheel set structure, it is significantly easier to meet the requirements on said wheel set such as installation space, costs, trans-mission ratio requirements, variability, and also the demand for a compact shift package.

By introducing a switch point 60 on the selector drum SW1c with the encircling groove, said groove also has a stop for the reverse gear, by means of a groove end or by means of the blockage by the switch point 60 itself. Both drums can therefore also be referenced for software-based control.

Figure 10:
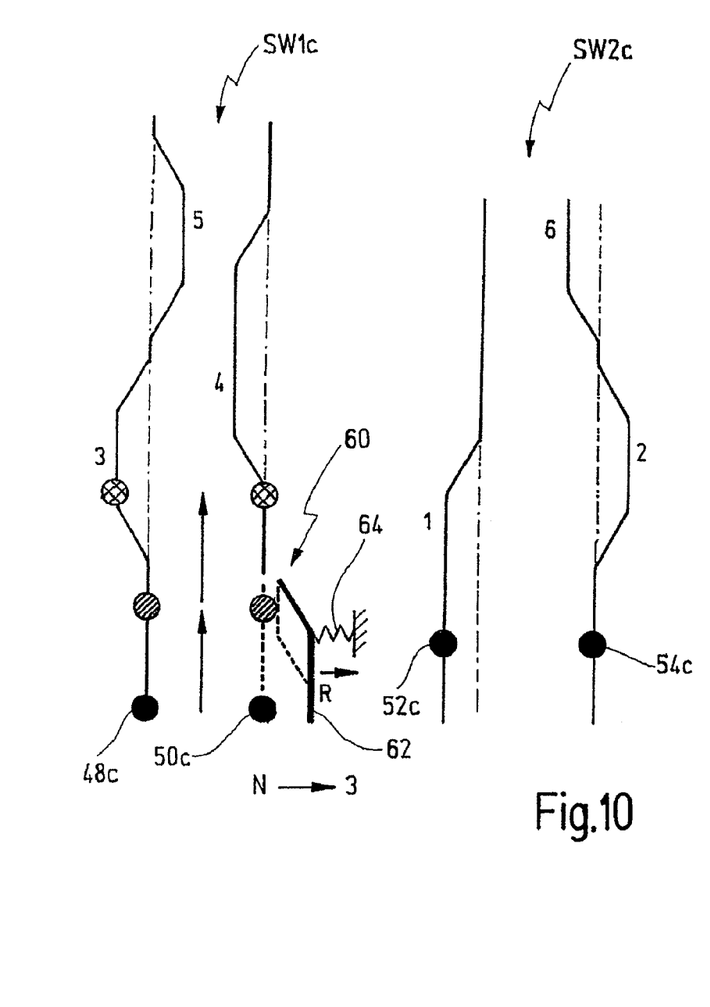
FIG. 10 shows the schematic sequence of a shift N→3 with the actuator arrangement of FIG. 9.
Figure 11:
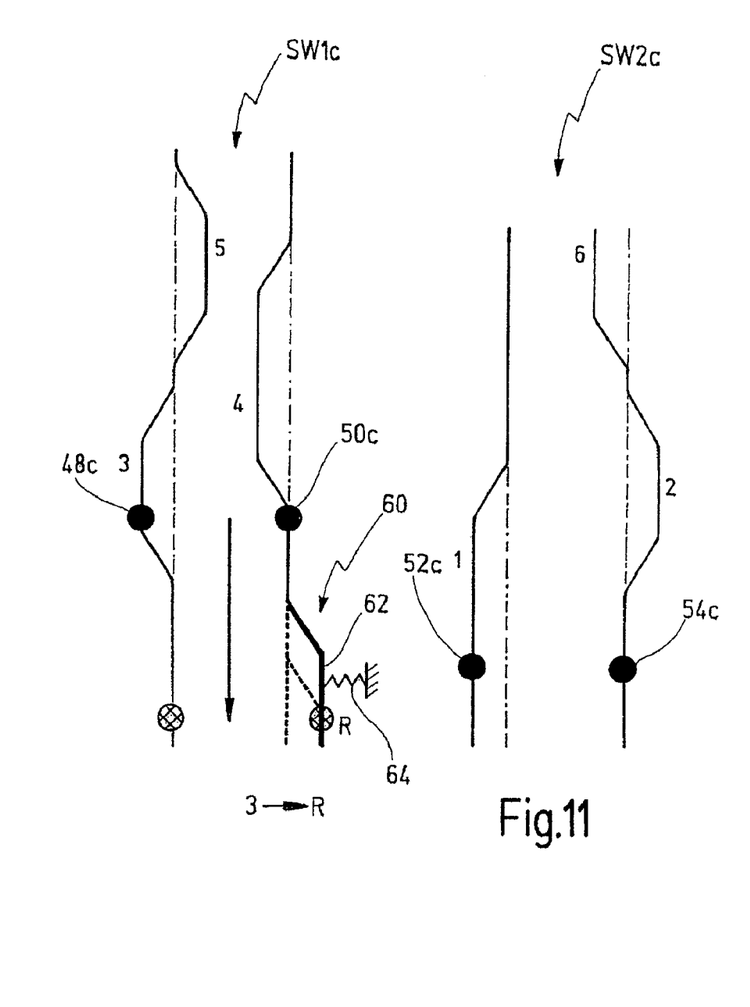
FIG. 11 shows the schematic sequence of a shift 3→R with the actuator arrangement of FIG. 9.

The shift sequence logic with passive (spring-force-controlled) switch point function is illustrated in FIGS. 10 and 11.

A further rotation of the selector drum SW1c beyond 360° is possible. The switch point 60 is deflected counter to the exerted spring force, and thereby bypassed, as it impinges on the cam follower 50c (sliding block), for example by means of an inclined face.

When the rotational direction is in the direction of R, the cam follower 50c is deflected by the switch point 60, since the latter is held in the base position (engagement of R possible) by means of the spring force.

The reverse gear can therefore be engaged independently of the other selector drum SW2c in a rotational-direction-dependent fashion.

Multiple upshifts are therefore generally not possible.

Figure 12:
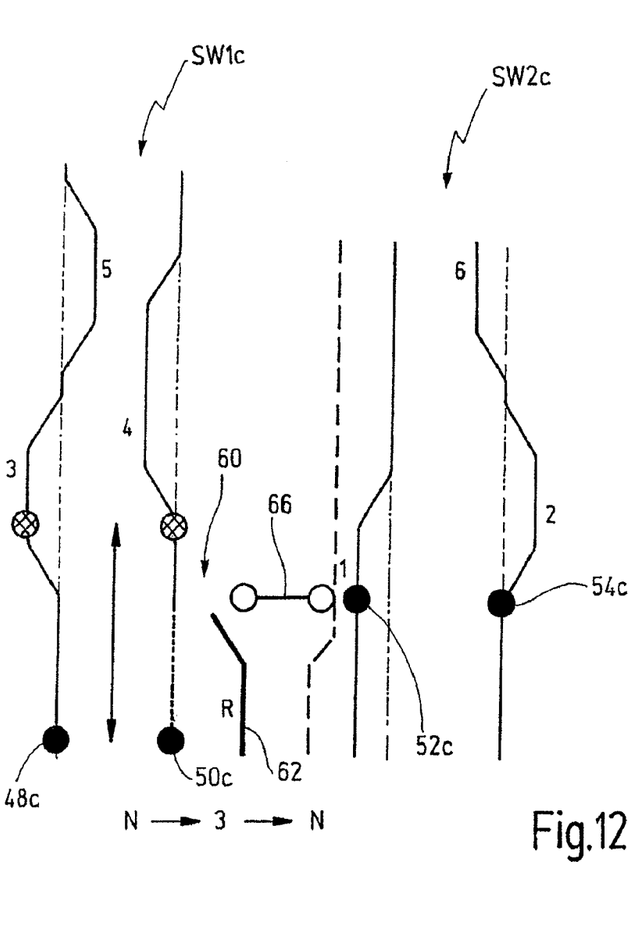
FIG. 12 shows the schematic sequence of a shift N→3→N with a modified embodiment of the actuator arrangement of FIG. 9, with a switch point for the reverse gear stage being actively actuable by means of a coupling member.
Figure 13:
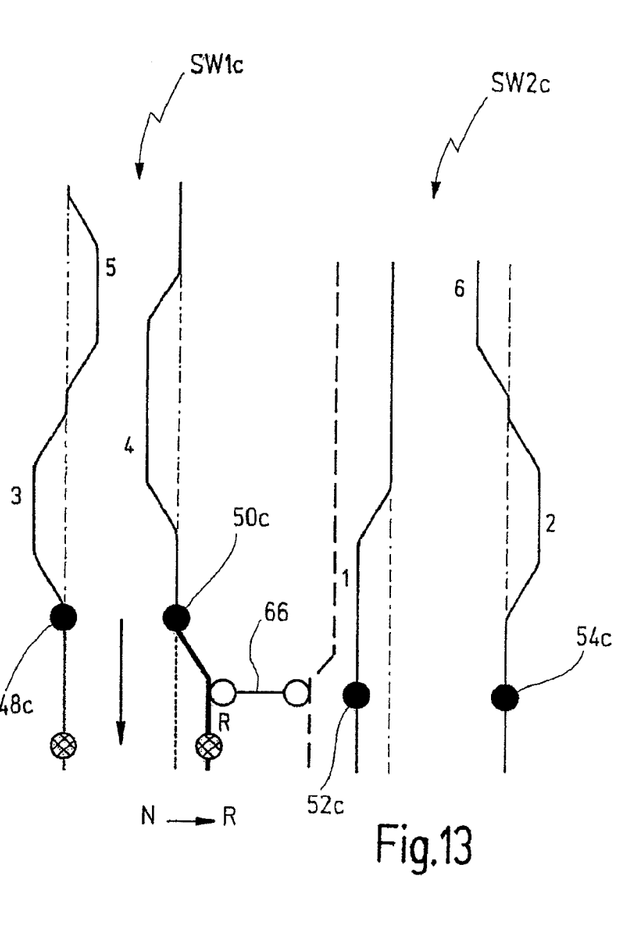
FIG. 13 shows the schematic sequence of a shift N→R with the modified embodiment of the actuator arrangement of FIG. 9.

The shift sequence logic is expanded by means of an integrated switch point function which is actively controlled by means of the selector drum SW2c (FIGS. 12, 13).

A further rotation of the selector drum SW1c beyond 360° is possible. The switch point 60 is bypassed.

When the rotational direction of the selector drum SW1c is in the direction of R, the latter is not engaged for as long as the switch point 60, by means of its dependency on selector drum SW2c, for example by means of the engaged $1^{st}$ gear, has not been activated. A movement of the selector drum below and beyond 0° can therefore take place. Multiple upshifts are also possible.

Only when the movement direction of the drum 60 is in the direction of the reverse gear and the switch point 60 is simultaneously activated by means of selector drum SW2c, for example by the engaged $1^{st}$ gear, is it possible to engage the reverse gear.

The $1^{st}$ and reverse gears can therefore be engaged at the same time on different partial transmissions. Driving away in the forward or reverse direction can therefore be carried out alternately (for example low-speed maneuvering, rocking free in the event of the vehicle being stuck) without a gearshift and therefore in rapid succession in terms of time, since only the corresponding clutch of the partial transmission need be activated. The change of traveling direction therefore is therefore carried out merely by means of the alternation of the clutches K1, K2.

What is claimed is:

1. An actuator arrangement for a twin-clutch transmission which has a first and a second partial transmission, with the first partial transmission containing odd forward gear stages and with the second partial transmission containing even forward gear stages, having at least one first and one second selector drum which have in each case one controllable drive motor and at least one control cam, with each control cam being assigned at least one cam follower, with it being possible for the cam followers to be connected in each case to a selector sleeve of an associated shift clutch pack in order to engage and disengage gear stages of the twin-clutch transmission, wherein the control cam of at least one selector drum encircles through at least 360°, the associated drive motor is designed to drive said selector drum through at least 360°, and the gear stages are distributed on the two selector drums, and arranged on the control cams, in such a way that at least one direct multiple shift can be carried out.

2. The actuator arrangement as claimed in claim 1, wherein the control cams have in each case at least one gear peripheral section and at least one neutral peripheral section, with a gear stage being engaged when an associated cam follower is situated in the gear peripheral section, and with none of the gear stages which are assigned to the control cam being engaged when the cam follower is situated in the neutral peripheral section.

3. The actuator arrangement as claimed in claim 2, wherein at least one of the selector drums has two control cams, with a gear peripheral section of the one control cam and a gear peripheral section of the second control cam partially overlapping in an over-lapping peripheral section.

4. The actuator arrangement as claimed in claim 1, wherein at least one of the selector drums is assigned both at least one even and at least one odd forward gear stage.

5. The actuator arrangement as claimed in claim 1, wherein the gear stages for the first gear and a reverse gear are assigned to one control cam.

6. The actuator arrangement as claimed in claim 1, wherein the gear stages for the first gear and a reverse gear are contained in one of the two partial transmissions.

7. The actuator arrangement as claimed in claim 5, wherein a gear peripheral section for the reverse gear is assigned to a selector drum whose range of rotation is limited to 360° or less.

8. The actuator arrangement as claimed in claim 1, wherein the one selector drum is assigned the gear stages for the first, the second, the sixth and a reverse gear.

9. The actuator arrangement as claimed in claim 1, wherein the one selector drum is assigned the gear stages for the first, the second, the fourth and a reverse gear.

10. The actuator arrangement as claimed in claim 1, wherein the one selector drum is assigned the gear stages for the first, the fourth, the sixth and a reverse gear.

11. The actuator arrangement as claimed in claim 1, wherein the control cams do not branch.

12. The actuator arrangement as claimed in claim 1, wherein the gear stages for the first gear and a reverse gear are contained in different partial transmissions.

13. The actuator arrangement as claimed in claim 1, wherein the gear stages for the first gear and a reverse gear are assigned to different control cams.

14. The actuator arrangement as claimed in claim 13, wherein the gear stages for the first gear and the reverse gear are contained in different partial transmissions.

15. The actuator arrangement as claimed in claim 13, wherein the gear stage for the reverse gear is assigned to the selector drum which encircles through at least 360°.

16. The actuator arrangement as claimed in claim 13, wherein a gear peripheral section of the reverse gear can be reached by the cam follower in only one rotational direction via a switch point of the associated control cam.

17. The actuator arrangement as claimed in claim 16, wherein the switch point can be deflected into an open position in the opposite rotational direction by means of the cam follower.

18. The actuator arrangement as claimed in claim 17, wherein the switch point is pre-loaded into a closed position by means of a spring.

19. The actuator arrangement as claimed in claim 16, wherein the switch point can be deflected by means of a coupling member.

20. The actuator arrangement as claimed in claim 19, wherein the coupling member is connected to the other selector drum and wherein the switch point is deflected by means of the coupling member into a closed position when, on the other selector drum, the gear stage for the first gear is engaged.

21. The actuator arrangement as claimed in claim 1, wherein the selector drums are mounted so as to be axially non-moveable.

22. An actuator arrangement for a twin-clutch transmission which has a first and a second partial transmission, with the first partial transmission containing odd forward gear stages and with the second partial transmission containing even forward gear stages, having at least one first and one second selector drum which have in each case one controllable drive motor and at least one control cam, with each control cam being assigned at least one cam follower, with it being possible for the cam followers to be connected in each case to a selector sleeve of an associated shift clutch pack (SK) in order to engage and disengage gear stages of the twin-clutch transmission, wherein the control cam of at least one selector drum forms a closed loop through at least 360°, and the associated drive motor is designed to drive said selector drum through at least 360°.

23. The actuator arrangement as claimed in claim 22, wherein the control cams have in each case at least one gear peripheral section and at least one neutral peripheral section, with a gear stage being engaged when an associated cam follower is situated in the gear peripheral section, and with none of the gear stages which are assigned to the control cam being engaged when the cam follower is situated in the neutral peripheral section.

24. The actuator arrangement as claimed in claim 23, wherein at least one of the selector drums has two control cams, with a gear peripheral section of the one control cam and a gear peripheral section of the second control cam partially overlapping in an over-lapping peripheral section.

25. The actuator arrangement as claimed in claim 22, wherein at least one of the selector drums is assigned both at least one even and at least one odd forward gear stage.

* * * * *